United States Patent [19]

Howard

[11] Patent Number: 4,639,977
[45] Date of Patent: Feb. 3, 1987

[54] COMBINATION ROPE GUARD AND ROPE BUNDLE KEEPER

[76] Inventor: William R. Howard, Rte. 2, Box 193 N, Brentwood, Calif. 94513

[21] Appl. No.: 834,163

[22] Filed: Feb. 27, 1986

[51] Int. Cl.⁴ .............................................. B65D 63/00
[52] U.S. Cl. .................................. 24/16 R; 24/17 A; 24/129 B; 24/130
[58] Field of Search ............. 24/129 R, 129 B, 129 A, 24/16 R, 17 A, 17 B, 17 R, 19, 130

[56] References Cited

U.S. PATENT DOCUMENTS

| | | | |
|---|---|---|---|
| 278,097 | 5/1883 | Collins | 24/129 B |
| 479,509 | 7/1892 | Heaphy, Jr. | |
| 656,431 | 8/1900 | Stewart | |
| 712,408 | 10/1902 | Priddat | |
| 749,834 | 1/1904 | Beisel | 24/16 R |
| 757,820 | 4/1904 | Lykke | 24/130 |
| 948,585 | 2/1910 | Bartran | 24/129 B |
| 1,083,958 | 1/1914 | Tod | 24/129 R |
| 1,188,026 | 6/1916 | Warman | 24/130 |
| 1,322,410 | 11/1919 | Connelly | |
| 1,942,734 | 1/1934 | Spindler | 24/129 B |
| 1,945,932 | 2/1934 | Caley | 24/17 AP |
| 2,268,845 | 1/1942 | Powers | 24/17 A |
| 2,299,697 | 10/1942 | Gruber | |
| 2,533,341 | 12/1950 | Alfano | 24/129 R |
| 3,267,540 | 8/1966 | Wolcott et al. | |
| 3,714,923 | 2/1973 | Mariani | |
| 4,355,444 | 10/1982 | Haney | |

FOREIGN PATENT DOCUMENTS

| | | | |
|---|---|---|---|
| 162500 | 3/1949 | Austria | 24/17 A |
| 8099 | 2/1916 | United Kingdom | 24/129 B |
| 975536 | 11/1964 | United Kingdom | 24/129 B |

Primary Examiner—Victor N. Sakran
Attorney, Agent, or Firm—Townsend and Townsend

[57] ABSTRACT

A rope guard and rope bundle keeper includes an elongate, flexible body having lateral edges extending between two ends. The body has a slit at each end; the slits extend inwardly away from the lateral edges in directions perpendicular to the length of the body. The body is made of a flexible, protective material, such as thick leather. As a rope guard, the body is placed between the tie down rope and the item to be protected in a region where the rope changes direction. The rope lies against the top or outer surface of the rope guard in the region between the two slits but passes through the slits to help maintain the rope guard in place. As a rope bundle keeper, the body is wrapped around the rope bundle so that it circumscribes the bundle. The two slits are inserted one into the other so to maintain the body in a ring-like, rope bundle keeper orientation.

5 Claims, 4 Drawing Figures

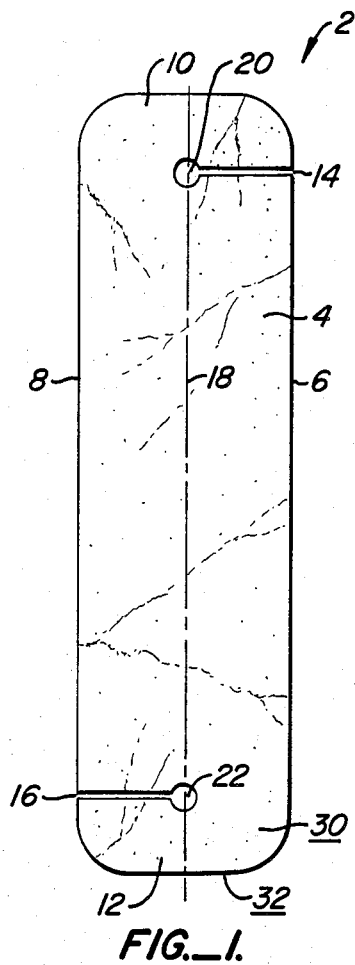
FIG._1.
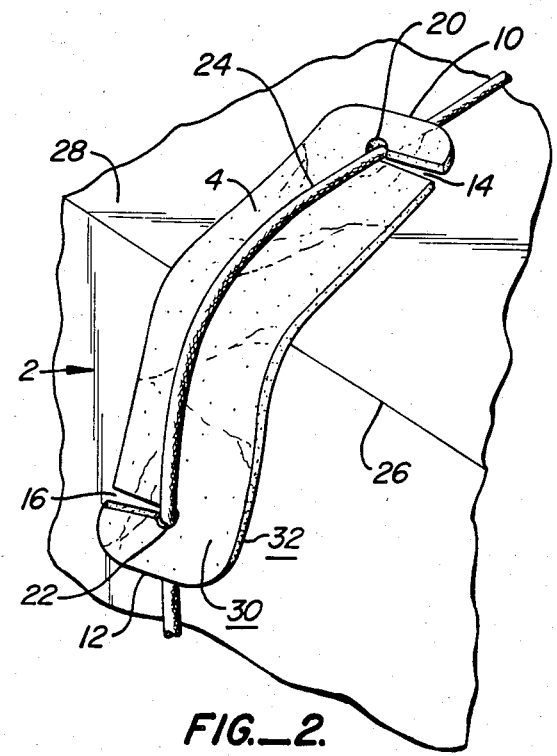
FIG._2.
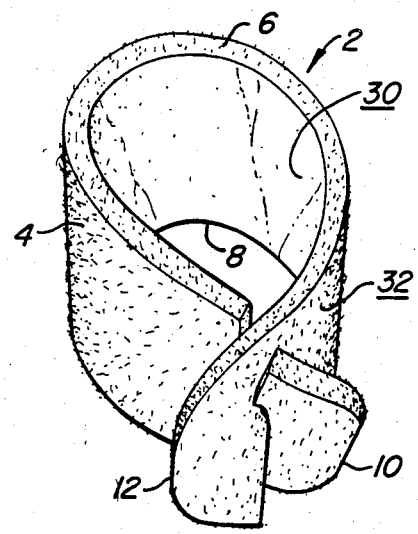
FIG._3.
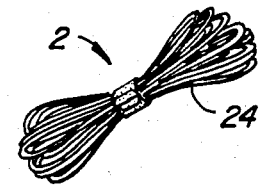
FIG._4.

COMBINATION ROPE GUARD AND ROPE BUNDLE KEEPER

BACKGROUND OF THE INVENTION

Transporting things by vehicle often requires that the items be stabilized or tied down in some manner. Ropes, lines and straps are therefore often tightly drawn over the top of the item, such as a piece of furniture, to keep it in place during transport. One of the problems with this is that even though the item is tied down, movement and vibration of the vehicle causes the item to shift and move slightly during transport. This causes the rope to bear against, and often damage, the point or points on the item against which it presses with the greatest force. These points are usually where the rope changes direction as it passes over the item due to a change in its shape. Also, the rope itself, even without vibration and other movement during transport, can cause denting and damage to the item, especially at the corners. Although the use of flat straps in lieu of round ropes helps to eliminate the problem, abrasion, denting and other damage to the item can still occur.

SUMMARY OF THE INVENTION

The invention is directed to a combination rope guard and rope bundle keeper which includes an elongate, flexible body having first and second ends. First and second slits extend laterally inwardly away from the sides of the body at positions adjacent the first and second ends. The slits preferably are oriented generally perpendicular to the length of the body.

The body is made of flexible, relatively thick material, such as thick leather, so to act as a protective barrier when used as a rope guard. When so used, the elongate body of the rope guard is placed between a tie down rope and the item to be protected in a region where the rope changes direction, such as at a corner of the item. The rope passes beneath the bottom surface of the body at one end, through the slit at that end, over the top surface of the rope guard in the region between the two slits, and passes through the slit at the other end.

The combination can also be used as a rope bundle keeper. To do so, a rope bundle is placed against the top surface of the body and the body is wrapped around the bundle so that it circumscribes the bundle. The two slits are then inserted one into the other so to maintain the body in a ring-like, rope bundle keeper orientation.

A primary feature of the invention is that it helps to spread out the force exerted by the rope against the item. It also acts as a wear guard or protector so that the rope rubs against the body of the combination rope guard and bundle keeper rather than against the item. To aid this propensity, it is preferred that the top or outer surface of the body be relatively smooth; the bottom or inner surface is preferably be soft, but not necessarily smooth. Therefore, movement of the item during transit will result in the rope rubbing against the outside of the body. The body, however, remains stationary relative to the item so that abrasion of the item does not occur.

Another feature of the invention arises from the sizing of the body and the spacing of the slits. By appropriately spacing of the slits, the combination rope guard and rope bundle keeper can be used to keep a bundle of rope in a neat, bundled condition. In addition, there is no danger of losing the combination guard and keeper when the rope is not in use because it is used to hold the bundle.

As used in this application, rope means not only a rope or line having a circular cross-section, but also flat strapping. Also, the body is to be made of a flexible, protective material, such as thick leather. Other materials can be used in place of leather. The precise properties of the protective material will be determined in large part on the force exerted by the rope against the body and the shape and size of the rope. For example, using a rope having a flat, cross-sectional shape may permit the use of a somewhat thinner protective material than would be required with a rope having a circular cross-sectional shape under similar circumstances.

Other features and advantages of the present invention will appear from the following description in which the preferred embodiment has been set forth in detail in conjunction with the accompanying drawings.

BRIEF DESCRIPTION OF THE DRAWINGS

FIG. 1 is a plan view showing a combination rope guard and rope bundle keeper made according to the invention.

FIG. 2 is a perspective view of the combination guard and keeper of FIG. 1 being used as a rope guard.

FIG. 3 is a perspective view of the combination guard and keeper in its ring-like, rope bundle keeper orientation.

FIG. 4 shows the combination guard and keeper of FIG. 3 being used as a rope bundle keeper.

DETAILED DESCRIPTION OF THE PREFERRED EMBODIMENT

Referring now to FIG. 1, combination rope guard and rope bundle keeper is shown to include an elongate, flexible body 4 made of a relatively thick piece of leather. Body 4 has first and second lateral edges 6, 8 extending between a first end 10 and a second end 12. First and second slits 14, 16 extend laterally inwardly from first and second lateral sides 6, 8 at first and second ends 10, 12 respectively. Slits 14, 16 are oriented generally perpendicular to the centerline or axis 18 of body 4. First and second slits 14, 16 have enlarged portions 20, 22 at their inner ends sized to accommodate a rope 24, shown in FIG. 2, having a circular cross-section.

FIG. 2 shows combination 2 placed between rope 24 and the edge 26 of an item of furniture 28 being held in position by rope 24. As is evident from FIG. 2, body 4 is positioned between rope 24 and item 28 with the rope passing through enlarged portion 20 of first slit 14 over the top surface 30 of body 4 and then back through portion 22 of second slit 16. In this manner force from rope 24, due to the tension of the rope, is not exerted directly on item 28. Rather, the force is exerted indirectly through body 4 which spreads out the force of rope 24 over a larger area than would occur if rope 24 rested directly on item 28.

It is preferred that top surface 30 be relatively smooth and slippery so that rope 24 slips over surface 30 easily. This helps to prevent bottom surface 32 from rubbing against edge 26.

Referring now to FIGS. 3 and 4, combination 2 is shown in its ring-like, rope bundle keeper orientation. In this embodiment, first and second ends 10, 12 are joined by inserting first and second slits 14, 16 to fit fully into one another. In this way, combination 2 can be used to hold rope 24 when not in use in a bundle. The distance between first and second slits 14, 16 is chosen so that the diameter of combination 2 when in its rope bundle keeper orientation of FIG. 3 is sufficient to snugly encompass the bundle of rope. It should be noted that it is preferred that top surface 30 face inwardly in the rope bundle keeper configuration. When this is done, combination 2 will have a slight bow or prebend opposite the bend shown in FIG. 2. This helps to keep combination 2 from slipping off of rope 24 when used to protect item 28.

In use, combination 2 is placed between rope 24 and edge 26 of item 28 and is secured in position by passing rope 24 through first and second slits 14, 16 until rope 24 is seated within enlarged portions 20, 22. Rope 24 is then tightened to secure item of furniture 28 in place. When rope 24 is not in use, it is bundled into a coil. The coil is flattened into a figure eight and the center or waist of the figure eight is placed against surface 30 of body 4. First and second ends 10, 12 are passed around the bundled rope 24 and first and second slits are inserted fully into one another. Combination 2, placed in its rope bundle keeper orientation of FIG. 3, thus keeps the rope coiled.

Modification and variation can be made to the disclosed embodiment without departing from the subject of the invention as defined in the following claims. For example, body 4 need not have a constant thickness as in the preferred embodiment, but, for example, could be thickened along its central region. Body 4 could be made of material other than leather and rope 24 could be other than round.

I claim:

1. A combination rope bundle keeper and rope guard, the rope guard for protecting an item being held in place by the rope from the rope pressing against the item at a position on the item where the rope changes direction due to a change in shape of the item, the combination comprising:
    an elongate, flat, flexible body member of a protective material, the body member including first and second lateral edges, a top surface, a bottom surface, a first end, a second end, a length and a width;
    a first slit, positioned at the first end, extending from the first lateral edge toward the second lateral edge in a first direction transverse to the length;
    a second slit, positioned at the second end a chosen distance from the first slit, extending from the second lateral edge toward the first lateral edge in a second direction transverse to the length;
    the body member manipulable between an extended rope guard orientation and a generally ring-like rope bundle keeper orientation with the first and second ends engaged at the first and second slits;
    the first and second slits sized for receipt of the rope with the rope passing through the first and second slits and lying adjacent a portion of the upper surface between the slits, the lower surface of the rope guard positioned against the item at the item position so the body member protects the item from the direct contact of the rope when the body member is in the rope guard orientation; and
    the chosen distance chosen so when the body member is in the rope bundle keeper orientation the body member circumscribes and snugly surrounds the rope bundle.

2. A method for using a tie down rope, the rope being in a coiled, bundled condition when not in use and in an elongate condition when used to secure an item in position, comprising the following steps:
    snugly encircling the rope bundle with a combination rope guard and bundle keeper having an elongate, flexible body of a protective material with outer and inner surfaces and laterally extending slits at either end of the body, the slits extending inwardly from opposite sides of the body, the body being wrapped about the rope bundle with the slits engaging one another to create a ring-like bundle keeper so to keep the rope bundle in its bundled condition;
    removing the combination rope guard and bundle keeper from the bundle by disengaging the slits from one another;
    placing the rope over an item;
    positioning the combination rope guard and bundle keeper at a selected area of the item where the rope changes direction; and
    securing the combination rope guard and bundle keeper to the rope at the selected area by directing the rope through the first and second slits with the portion of the body between the first and second slits lying between the rope and the selected area of the item so the body protects the item from direct contact by the rope.

3. The method of claim 2 wherein in the snugly encircling step the inner surface faces the rope bundle so to create a pre-bend in the body which helps to keep the body secured to the rope during and after the securing step.

4. The method of claim 2 further comprising the step of tightening the rope.

5. The method of claim 4 wherein the tightening step occurs after the securing step.

* * * * *